US012179519B2

(12) United States Patent
 Coombs et al.

(10) Patent No.: US 12,179,519 B2
(45) Date of Patent: Dec. 31, 2024

(54) AXLE ASSEMBLY HAVING A SPINDLE PLUG AND A SLEEVE

(71) Applicant: ArvinMeritor Technology, LLC, Troy, MI (US)

(72) Inventors: Joshua Coombs, East Lansing, MI (US); Brian Vinson, Howell, MI (US); Gary Meyers, South Lyon, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 471 days.

(21) Appl. No.: 17/570,734

(22) Filed: Jan. 7, 2022

(65) Prior Publication Data

US 2023/0219381 A1 Jul. 13, 2023

(51) Int. Cl.
| | |
|---|---|
| *B60C 23/00* | (2006.01) |
| *B60B 27/00* | (2006.01) |
| *B60B 37/10* | (2006.01) |
| *B60B 27/02* | (2006.01) |

(52) U.S. Cl.
CPC .... *B60C 23/00345* (2020.05); *B60B 27/0047* (2013.01); *B60B 27/0068* (2013.01); *B60B 37/10* (2013.01); *B60C 23/00318* (2020.05); *B60B 27/02* (2013.01)

(58) Field of Classification Search
CPC ........ B60C 23/00345; B60C 23/00318; B60C 23/00327
See application file for complete search history.

(56) References Cited

U.S. PATENT DOCUMENTS

| | | | |
|---|---|---|---|
| 3,928,780 A * | 12/1975 | Vannini | G01P 3/488 |
| | | | 310/168 |
| 6,105,645 A | 8/2000 | Ingram | |
| 6,425,427 B1 * | 7/2002 | Stech | B60C 23/00363 |
| | | | 152/417 |
| 6,435,238 B1 | 8/2002 | Hennig | |
| 6,585,019 B1 | 7/2003 | Ingram | |
| 6,968,882 B2 | 11/2005 | Ingram | |
| 7,302,980 B2 | 12/2007 | Ingram | |
| 7,416,005 B2 | 8/2008 | Hennig et al. | |
| 7,418,989 B2 | 9/2008 | Ingram | |
| 7,896,045 B2 | 3/2011 | Solie et al. | |
| 7,963,159 B2 | 6/2011 | Ingram et al. | |
| 7,975,739 B1 | 7/2011 | Ingram | |
| 8,028,732 B1 | 10/2011 | Ingram et al. | |

(Continued)

FOREIGN PATENT DOCUMENTS

WO 2017040802 A1 3/2017

OTHER PUBLICATIONS

Meritor Heavy Vehicle Systems, LLC, "Meritor Tire Inflation System (MTIS) by PSI including Meritor ThermALERT" [PB-9999 Revised May 2007], 12 Pages.

(Continued)

*Primary Examiner* — Jason R Bellinger
(74) *Attorney, Agent, or Firm* — Brooks Kushman PC (57) ABSTRACT

An axle assembly having a hose, a spindle plug, a sleeve, and a rotary union adapted to be fluidly connected to a tire. The spindle plug may be disposed in a spindle. The hose may be fluidly connected to the rotary union. The sleeve may encircle the hose and extend from the spindle plug to a stator of the rotary union. The sleeve cooperates with the spindle plug to limit rotation of the stator and the hose.

20 Claims, 6 Drawing Sheets

(56) References Cited

U.S. PATENT DOCUMENTS

| | | |
|---|---|---|
| 8,505,600 B2 | 8/2013 | Padula et al. |
| 9,221,395 B2 | 12/2015 | Honig et al. |
| 9,278,587 B2 | 3/2016 | Honig |
| 9,283,818 B2 | 3/2016 | Kenney et al. |
| 9,315,077 B2 | 4/2016 | Flory et al. |
| 9,333,813 B2 | 5/2016 | Tiziani et al. |
| 9,346,329 B2 | 5/2016 | Keane |
| 9,352,621 B2 | 5/2016 | Morgan |
| 9,409,450 B2 | 8/2016 | Dean et al. |
| 9,452,644 B2 | 9/2016 | Kenney et al. |
| 9,452,645 B2 | 9/2016 | Polubinski et al. |
| 9,481,213 B2 | 11/2016 | Kenney et al. |
| 9,511,635 B2 | 12/2016 | Berkness et al. |
| 9,517,663 B2 | 12/2016 | Lewandowski et al. |
| 9,539,865 B2 | 1/2017 | Lakin et al. |
| 9,561,694 B2 | 2/2017 | Ingram et al. |
| 9,597,931 B2 | 3/2017 | Dean et al. |
| 9,815,340 B2 | 11/2017 | Trostle et al. |
| 9,925,835 B1 * | 3/2018 | Stech ............... B60C 23/00345 |
| 9,950,574 B2 | 4/2018 | Berkness et al. |
| 10,005,325 B2 | 6/2018 | Cappello et al. |
| 10,086,660 B1 | 10/2018 | Berkness et al. |
| 10,315,469 B2 | 6/2019 | Coombs |
| 10,343,467 B1 | 7/2019 | Dooley et al. |
| 10,391,824 B2 | 8/2019 | Trostle et al. |
| 10,543,849 B2 | 1/2020 | Jankowski et al. |
| 10,596,862 B1 | 3/2020 | Cappello et al. |
| 10,596,863 B1 | 3/2020 | Castriotta |
| 10,596,864 B1 | 3/2020 | Berkness et al. |
| 10,647,169 B1 | 5/2020 | Castriotta et al. |
| 11,865,873 B2 * | 1/2024 | Kannatti ............ B60C 23/00363 |
| 2004/0238093 A1 | 12/2004 | Nelson et al. |
| 2015/0059947 A1 | 3/2015 | Power et al. |
| 2015/0096655 A1 | 4/2015 | Koulinitch et al. |
| 2016/0288590 A1 | 10/2016 | Hennig et al. |
| 2019/0299723 A1 * | 10/2019 | Colussi ............. B60C 23/00363 |
| 2021/0364039 A1 | 11/2021 | Shah et al. |
| 2023/0191853 A1 * | 6/2023 | Colussi ................ B60C 23/007 |
| | | 152/417 |
| 2023/0219380 A1 * | 7/2023 | Coombs ............ B60C 23/00318 |
| | | 137/231 |

OTHER PUBLICATIONS

Examination Report dated Feb. 2, 2024 for related Australian Appln. No. 2022291556, 5 pages.

Extended European Search Report dated May 17, 2023 for related European Appln. No. 23150175.0; 9 Pages.

\* cited by examiner

AXLE ASSEMBLY HAVING A SPINDLE PLUG AND A SLEEVE

TECHNICAL FIELD

This invention relates to an axle assembly that has a sleeve that extends between a spindle plug and a rotary union to limit rotation of a hose that is fluidly connected to the rotary union.

BACKGROUND

A rotary union for a tire inflation system is disclosed in U.S. Patent Publication No. 2016/0288590.

SUMMARY

In at least one configuration an axle assembly is provided. The axle assembly includes a spindle, a hub, a hub cap, a spindle plug, a hose, and a rotary union. The spindle defines a spindle hole that is disposed along an axis. The hub is rotatable about the axis with respect to the spindle. The hub cap is mounted to the hub and is rotatable with the hub. The spindle plug is disposed in the spindle hole and is fixedly positioned with respect to the spindle. The spindle plug defines an opening through which the hose extends. The rotary union has a stator and a rotatable fitting that is fluidly connected to the hose and rotatable about the axis with respect to the stator. The rotatable fitting is adapted to be fluidly connected to a tire. The sleeve encircles the hose and extends from the spindle plug to the stator. The sleeve cooperates with the spindle plug to limit rotation of the stator and the hose about the axis.

In at least one configuration an axle assembly is provided. The axle assembly includes a spindle, a hub, a spindle plug, a hose, a rotary union, and a sleeve. The spindle defines a spindle hole that is disposed along an axis. The hub is rotatable about the axis with respect to the spindle. The spindle plug is disposed in the spindle hole and is fixedly positioned with respect to the spindle. The spindle plug defines an opening through which the hose extends. The rotary union has a stator and a rotatable fitting that is fluidly connected to the hose and rotatable about the axis with respect to the stator. The hose is received inside the stator. The rotatable fitting is adapted to be fluidly connected to a tire. The sleeve receives the hose and extends from the spindle plug to the stator. The sleeve limits rotation of the stator and the hose about the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
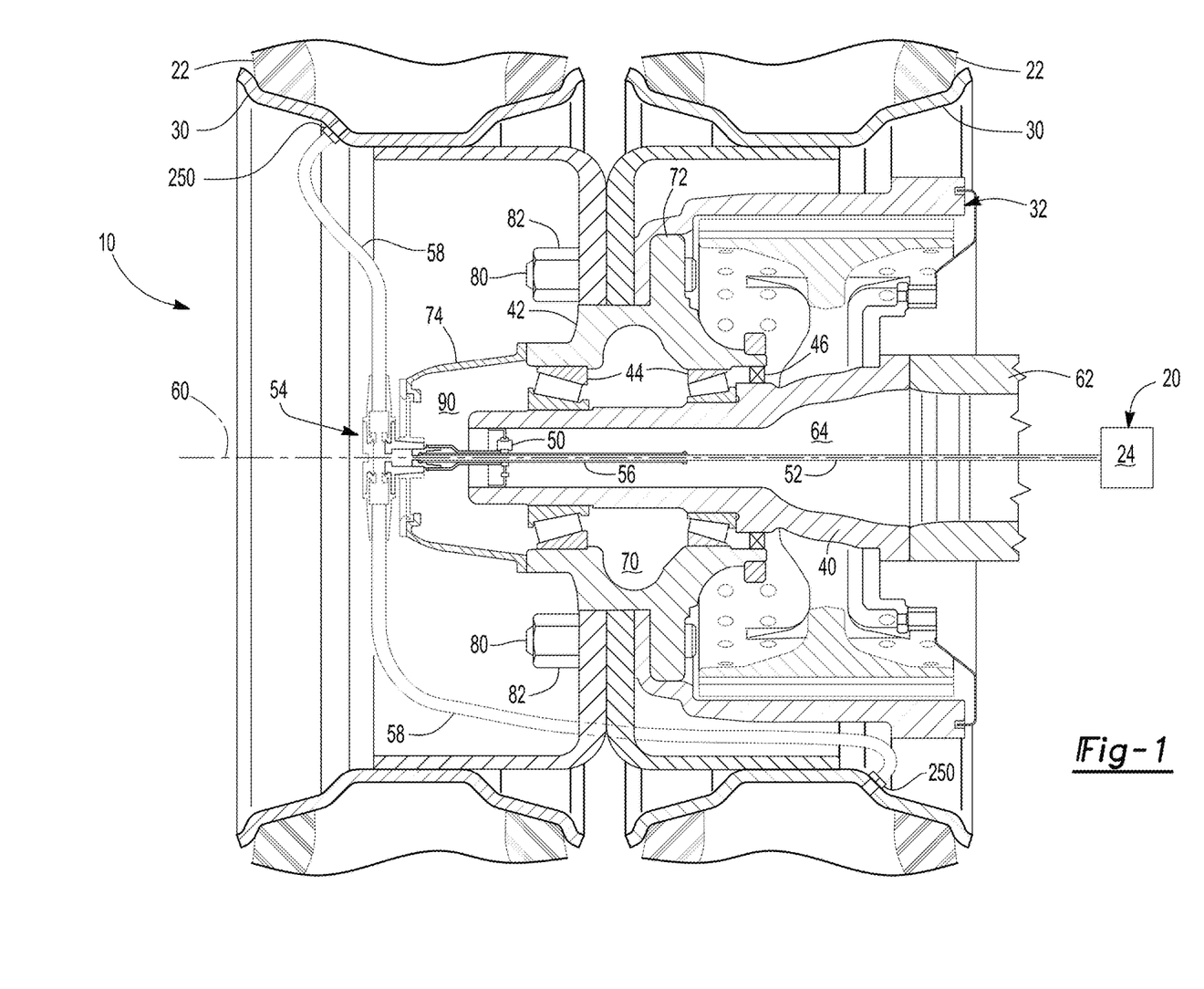
FIG. 1 is a section view of a wheel end of an axle assembly.

Referring to FIG. 1, portion of an axle assembly 10 is shown. The axle assembly 10 may be provided with a vehicle like a truck, bus, farm equipment, mining equipment, military transport or weaponry vehicle, cargo loading equipment for land, air, or marine vessels, or a trailer for transporting cargo.

As an overview, the axle assembly 10 may be associated with a tire inflation system 20 that may help obtain and/or maintain a desired pressure within one or more tires 22. The tire inflation system 20 may be disposed on the vehicle and may be configured to provide a pressurized gas or pressurized gas mixture to one or more tires 22, exhaust the pressurized gas or pressurized gas mixture from one or more tires 22, or both. For clarity, the term "pressurized gas" may refer to a pressurized gas mixture (e.g., air) or a purified pressurized gas or gas mixture (e.g., nitrogen). For convenience in reference, the term "air" is used below as a generic designator that is not intended to be limiting to a particular pressurized gas or gas mixture (e.g., an "air passage" may facilitate the flow of a pressurized gas other than air). Tire inflation or deflation may be desired when the tire pressure is not sufficiently close to the tire pressure specified by the vehicle manufacturer and/or is inappropriate for the type of ground over which a vehicle is travelling. For instance, higher tire pressures may be desired when a vehicle is travelling on a paved road as compared to when a vehicle is travelling off-road.

The tire inflation system 20 may be fluidly connected to a pressurized gas source 24. The pressurized gas source 24 may be configured to supply or store a volume of a pressurized gas. For example, the pressurized gas source 24 may be a tank, a pump like a compressor, or combinations thereof. The pressurized gas source 24 may be configured to provide pressurized gas at a pressure that is greater than or equal to a desired inflation pressure of a tire 22. The pressurized gas source 24 may be disposed on the vehicle and may be fluidly connected to at least one tire 22 via passages in various components.

The axle assembly 10 may be configured to support one or more wheels 30. The axle assembly also be configured to support a brake assembly 32, such as a friction brake like a disc brake or drum brake. The axle assembly 10 may be provided in a steerable configuration or a non-steerable configuration. In a steerable configuration, the axle assembly 10 may be a steerable structural component, such as a steering knuckle. In at least one configuration, the axle assembly 10 may include a spindle 40, a hub 42, one or more wheel bearings 44, and a hub seal 46. The axle assembly may also include a spindle plug 50, a hose 52, a rotary union 54, a sleeve 56, and one or more hose assemblies 58.

The spindle 40 may be disposed along or may extend around an axis 60. The spindle 40 may be fixedly positioned with respect to a structural component 62, such as a steering knuckle or an axle housing. It is contemplated that the spindle 40 may be integrally formed with the structural component 62 rather than being a separate part from the structural component 62. In at least one configuration, the spindle 40 may define a spindle hole 64.

The spindle hole 64 may be disposed along the axis 60. The spindle hole 64 may be a through hole that may extend through the spindle 40. The spindle hole 64 may receive various components, such as the spindle plug 50, the hose 52, and the sleeve 56. In a drive axle configuration, the spindle hole 64 may also receive an axle shaft that may operatively connect a power source or torque source such as an engine or electric motor to the hub 42 to help propel the vehicle.

The hub 42 may be rotatable about the axis 60 with respect to the spindle 40. In addition, the hub 42 may facilitate mounting of at least one wheel 30. In at least one configuration, the hub 42 may include a hub cavity 70, a hub mounting flange 72, and a hub cap 74.

The hub cavity 70 may be disposed inside the hub 42 and may be encircled by the hub 42. As such, the hub cavity 70 may extend around the axis 60. The hub cavity 70 may receive at least a portion of various components of the axle assembly 10, such as the spindle 40, one or more wheel bearings 44, and the hub seal 46.

The hub mounting flange 72 may facilitate mounting of at least one wheel 30. For example, the hub mounting flange 72 may extend around the axis 60 and away from the axis 60 and may include a set of mounting fastener holes that may each receive a mounting lug bolt 80. A mounting lug bolt 80 may extend through a corresponding hole in a wheel 30. A lug nut 82 may be threaded onto a mounting lug bolt 80 to secure a wheel 30 to the hub 42. In the configuration shown in FIG. 1, two wheels 30 are illustrated that each support a corresponding tire 22; however, it is contemplated that a single wheel 30 and tire 22 may be provided.

The hub cap 74 may be disposed proximate an outboard end of the hub 42. The hub cap 74 may help enclose the hub cavity 70. In at least one configuration, the hub cap 74 define a hub cap cavity 90 that may receive at least a portion of the rotary union 54.

One or more wheel bearings 44 may be disposed on the spindle 40 and may rotatably support the hub 42. In the configuration shown, two wheel bearings 44 are illustrated. A wheel bearing 44 may have any suitable configuration. For instance, a wheel bearing 44 may include a plurality of rolling elements, such as balls or rollers, that may be disposed between an inner race and an outer race. The inner race may encircle and may engage the spindle 40. The outer race may engage the hub 42 and may extend around the inner race.

The hub seal 46 may extend from the spindle 40 to the hub 42. The hub seal 46 may be disposed near an inboard end of the hub 42 that may be disposed opposite the hub cap 74. The hub 42, hub seal 46, and the hub cap 74 may cooperate to inhibit contaminants from entering the hub cavity 70.

Figure 2:
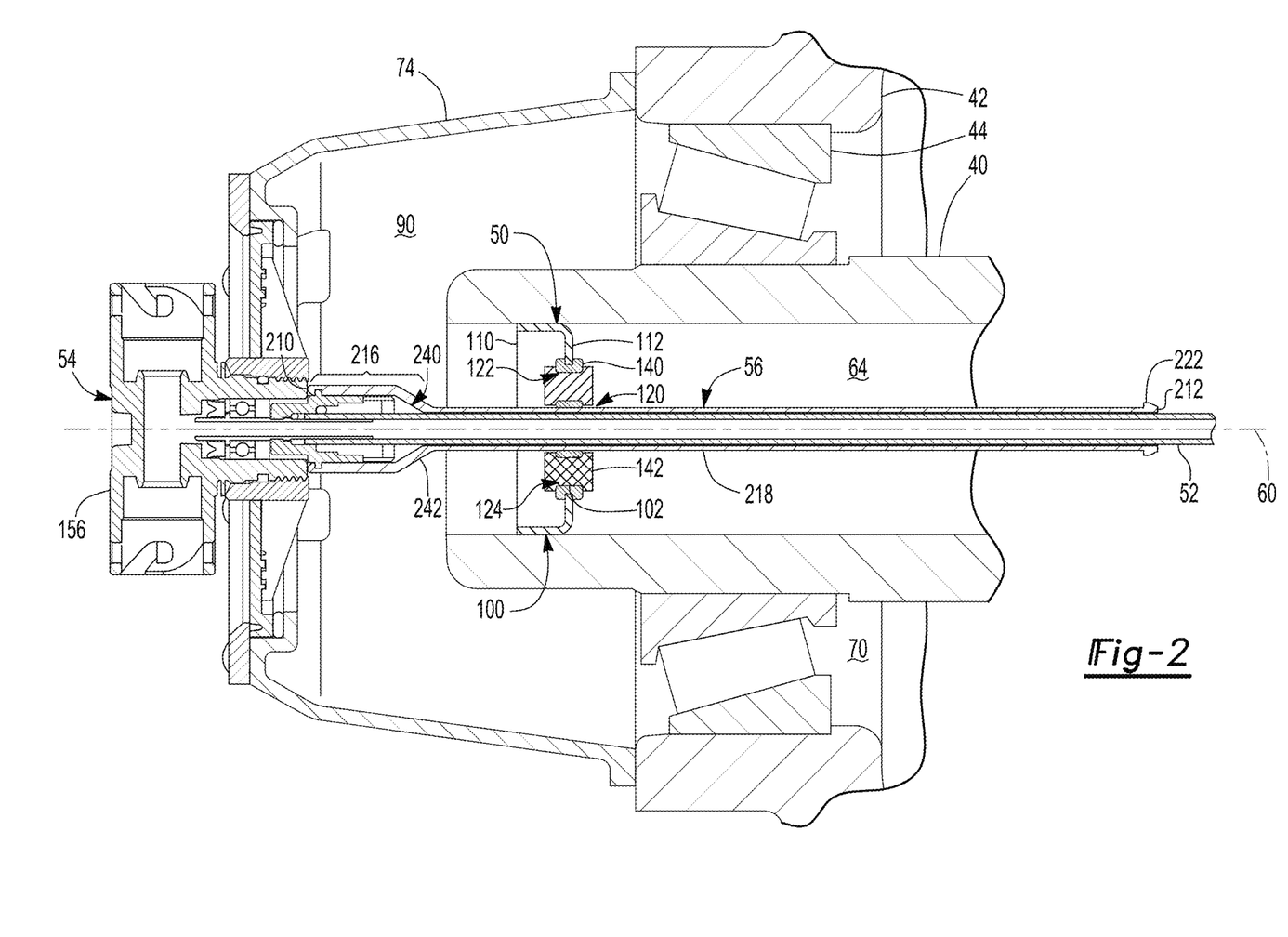
FIG. 2 is a magnified view of a portion of FIG. 1 without hose assemblies that fluidly connect a rotary union to a tire.

Referring primarily to FIG. 2, the spindle plug 50 may be disposed in the spindle hole 64. The spindle plug 50 may be fixedly positioned with respect to the spindle 40. As such, the spindle plug 50 may not rotate about the axis 60 with respect to the spindle 40. The spindle plug 50 may be fixed to the spindle 40 in any suitable manner, such as with an interference fit, weld, threaded connection, one or more fasteners, or the like.

Figure 4:
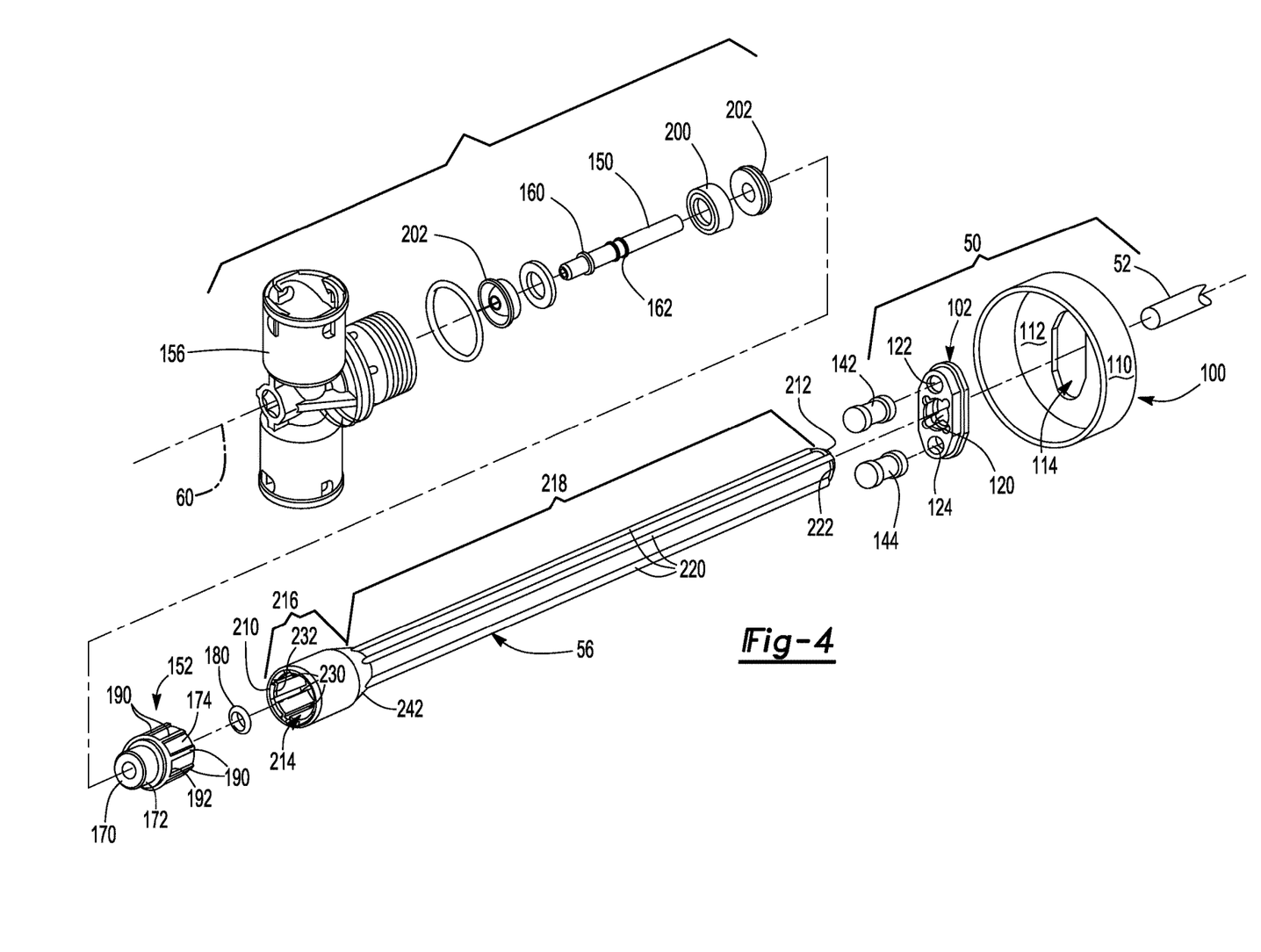
FIG. 4 is an exploded view of the components shown in FIG. 3.

Referring primarily to FIGS. 2 and 4, the spindle plug 50 may be made of one or more components. In at least one configuration, the spindle plug 50 may include a body 100 and an insert 102. The body 100 and the insert 102 are illustrated as being separate parts; however it is contemplated that the body 100 and the insert 102 may be provided as a unitary one-piece component.

The body 100 may extend from the spindle 40 toward the axis 60. In at least one configuration, the body 100 may include an annular wall 110 and a plug wall 112. The annular wall 110 may extend around or encircle the axis 60 and may engage the spindle 40. The plug wall 112 may extend from the annular wall 110 toward the axis 60. The plug wall 112 may define an opening 114 that may receive the insert 102.

The insert 102 may be at least partially received in the opening 114. In at least one configuration, the insert 102 may define a groove that may receive the plug wall 112 to inhibit movement of the insert 102 with respect to the body 100. The insert 102 may define one or more holes or openings. For instance, the insert 102 may include an opening 120, which may also be referred to as a hose opening. The insert 102 may also include a vent opening 122, a sensor opening 124, or both.

Figure 5:
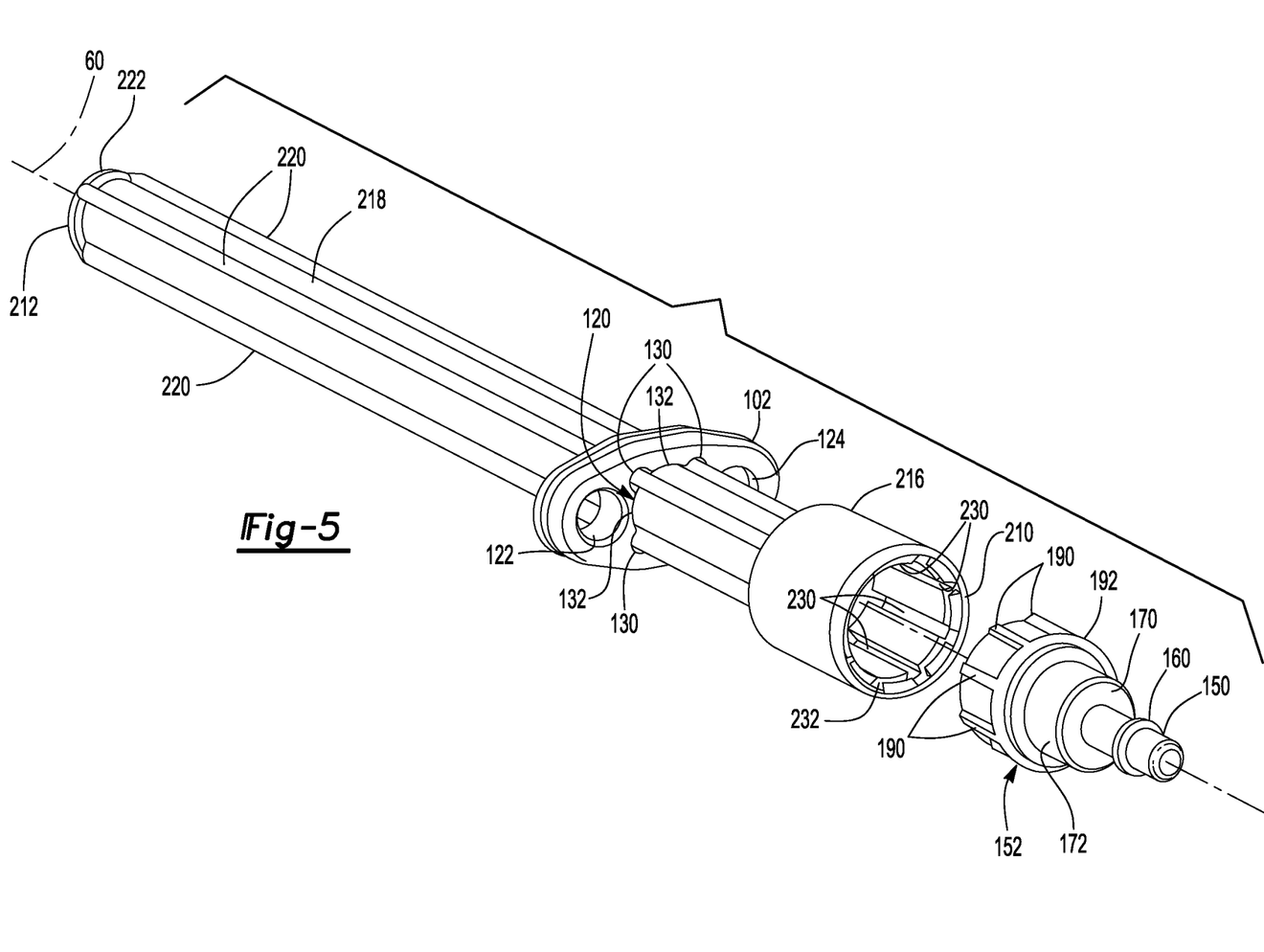
FIG. 5 is a partially exploded perspective view of some components shown in FIG. 4.

The opening 120 may be configured as a through hole through which the hose 52 and the sleeve 56 may extend. In at least one configuration, the opening 120 may be disposed at or near the center of the insert 102. For instance, the opening 120 may extend along the axis 60. The opening 120 may be provided with a cross-sectional shape that may inhibit rotation of the sleeve 56. For instance, the opening 120 may have a noncircular shape or noncircular profile that may receive the sleeve 56 such that one or more surfaces of the insert 102 that define the opening 120 may engage the sleeve 56 and resist or limit rotation twisting of the sleeve 56 about the axis 60. In the configuration shown and as is best shown in FIG. 5, the opening 120 may have one or more recesses 130 that extend away from the axis 60. An arcuate wall 132 may extend from one recess 130 to an adjacent recess 130 when multiple recesses are provided. The arcuate wall 132 may be radially disposed with respect to the axis 60. The recesses 130 and arcuate walls 132 may engage or mate with a portion of the sleeve 56 having a similar profile to resist twisting or rotation of the sleeve 56 as will be discussed in more detail below. It is contemplated that the opening 120 may be provided in different configurations that may or may not include recesses 130 and arcuate walls 132. For instance, the opening 120 may be configured as a noncircular shape such as an oval, triangle, quadrilateral, or shape having additional sides.

Referring primarily to FIGS. 2, 4, and 5, the vent opening 122 may be configured as a through hole that may allow air to pass between the spindle hole 64 and the hub cap cavity 90. The vent opening 122 may be spaced apart from the opening 120. In at least one configuration, the spindle hole 64 may be fluidly connected to the surrounding environment via a port. As such, the vent opening 122 may allow pressure to equalize between the hub cap cavity 90 and the surrounding environment. A filter 140 may be received in the vent opening 122. The filter 140 may inhibit contaminants from entering the hub cap cavity 90.

The sensor opening 124 may be configured as a through hole that may receive a sensor 142. The sensor may be of any suitable type. For instance, the sensor 142 may be an accelerometer, temperature sensor, vibration sensor, or the like that may provide a signal indicative of the environment inside the hub cavity 70 or an attribute of a component disposed proximate the wheel end or disposed inside the hub cavity 70. For instance, the sensor 142 may provide a signal indicative of the operating state of one or more wheel bearings 44. As an example, a signal that is indicative of elevated temperature or vibrational characteristics may be indicative of wear or substandard performance of a wheel bearing 44.

Referring primarily to FIGS. 1 and 2, the hose 52 may fluidly connect the pressurized gas source 24 to the rotary union 54. In at least one configuration, the hose 52 or a portion thereof may extend along the axis 60. The hose 52 may be made of any suitable material, such as a polymeric material. The hose 52 may be fluidly coupled to a hose fitting that may be provided with a through hole in the axle assembly to facilitate a fluid connection to the pressurized gas source 24. As such, one end of the hose 52 may be mounted to a portion of the axle assembly such as the spindle or axle housing while the other end may be mounted to or fluidly connected to the rotary union 54.

The rotary union 54 may be configured to fluidly connect the hose 52 to one or more hose assemblies 58. In at least one configuration and as is best shown with reference to FIGS. 4 and 6, the rotary union 54 may include a torque tube 150, a stator 152, a hose retainer 154, and a rotatable fitting 156.

Figure 6:
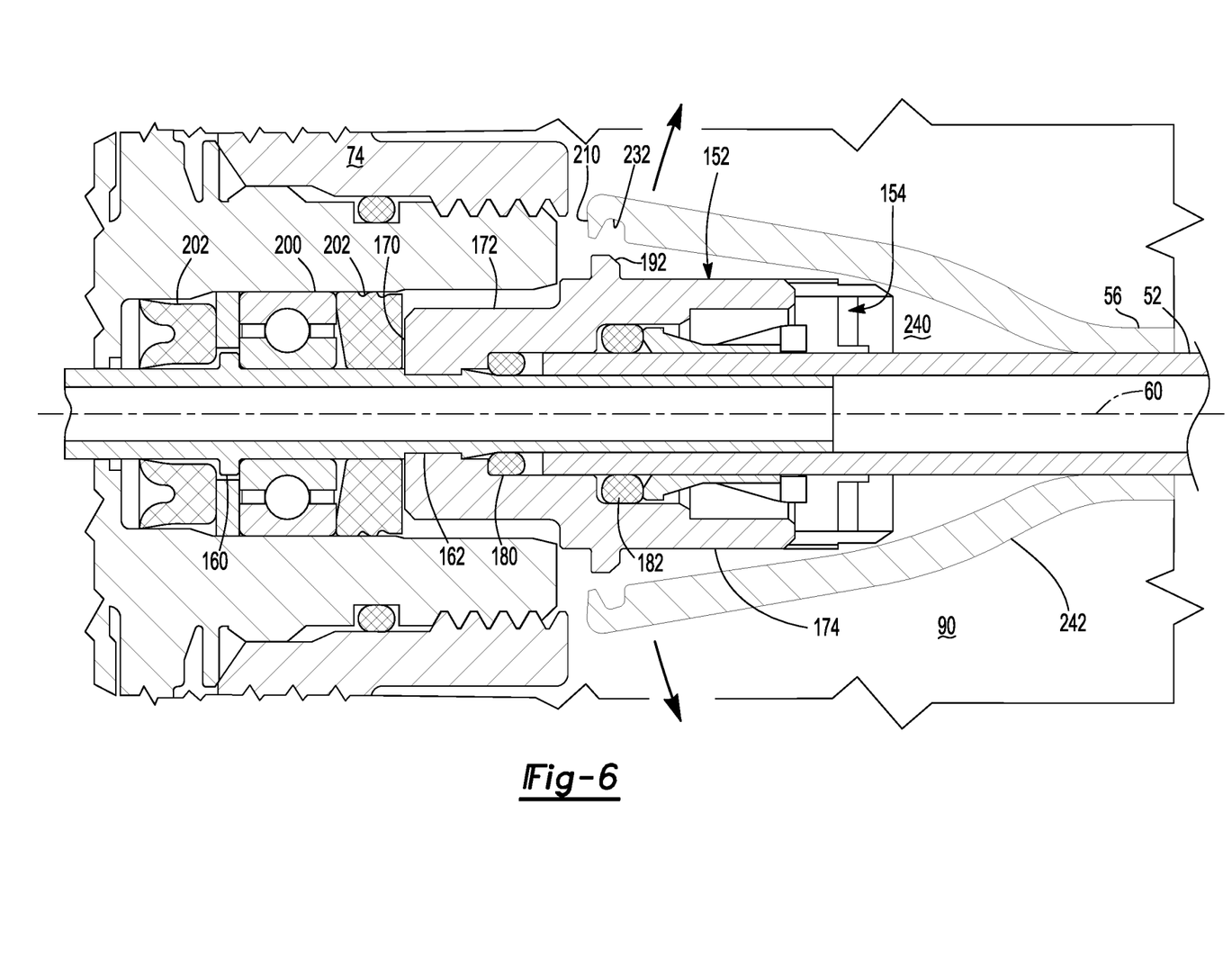
FIG. 6 is a magnified view of a portion of FIG. 2 showing a portion of the sleeve compressed to disengage sleeve from the rotary union.

The torque tube 150 may be a hollow tube that may be disposed along the axis 60. The torque tube 150 may have a first end and a second end. The first end may be fluidly connected to the hose 52. For instance, the first end may be received inside of the hose 52 and may engage or contact the hose 52. The second end may be disposed opposite the first end. For example, the second end may face toward and may be received inside the rotatable fitting 156. As such, the torque tube 150 may provide a fluid connection between the hose 52 and the rotatable fitting 156. In at least one configuration, the torque tube 150 may include a protrusion 160 and a stator retaining feature 162.

The protrusion 160 may inhibit axial movement of the torque tube 150. The protrusion 160 may extend away from the axis 60 and may partially or completely extend around the axis 60.

The stator retaining feature 162 may couple the stator 152 to the torque tube 150. In at least one configuration, the stator retaining feature 162 may be configured as a barb, recess, or barb and recess that may engage or be received inside of the stator 152 and that may inhibit axial movement of the stator 152 with respect to the torque tube 150. It is also contemplated that that stator retaining feature 162 may be provided as an interference fit and may not include a barb, a recess, or both.

Referring to FIGS. 4-6, the stator 152 may extend from the torque tube 150 in a direction that extends toward the spindle plug 50. The stator 152 may be received inside of the hub cap cavity 90 and may be spaced apart from the rotatable fitting 156. In at least one configuration, the stator 152 may include an end wall 170, a first socket wall 172, and a second socket wall 174.

The end wall 170 may be disposed at an end of the stator 152. The end wall 170 may be received inside of the rotatable fitting 156. The end wall 170 may define a hole through which the torque tube 150 may extend.

The first socket wall 172 may extend from the end wall 170 in a direction that extends toward the spindle plug 50. The first socket wall 172 may encircle the axis 60, the torque tube 150, and optionally a portion of the hose 52. The first socket wall 172 may have a larger inside diameter than the hole in the end wall 170. In addition, the first socket wall 172 may engage the hose 52, the torque tube 150, or both. The first socket wall 172 may be received inside the rotatable fitting 156. A seal 180 such as an O-ring may extend from the torque tube 150 to the first socket wall 172.

The second socket wall 174 may extend from the first socket wall 172 in a direction that extends toward the spindle plug 50. The second socket wall 174 may encircle the axis 60, the torque tube 150, a portion of the hose 52, and the hose retainer 154. The second socket wall 174 or a portion thereof may have a larger outside diameter than the first socket wall 172, a larger inside diameter than the first socket wall 172, or both. A seal 182 such as an O-ring may extend from the hose 52 away from the axis 60 to an interior side of the second socket wall 174. In at least one configuration, the second socket wall 174 may include one or more anti-rotation elements 190 and a retaining element 192.

Referring primarily to FIG. 5, one or more anti-rotation elements 190 may be provided that may engage the sleeve 56 to help inhibit rotation of the sleeve 56 with respect to the stator 152. An anti-rotation element 190 may have any suitable configuration. For instance, an anti-rotation element 190 may have a male configuration, a female configuration, or both. In the configuration shown, the anti-rotation elements 190 are configured as ribs that extend from an exterior side of the second socket wall 174 in a direction that extends away from the axis 60. A plurality of anti-rotation elements 190 may be provided that may be spaced apart from each other and may be arranged around the axis 60. In at least one configuration, the anti-rotation elements 190 or a portion thereof may extend parallel or substantially parallel to the axis 60.

Referring to FIGS. 5 and 6, the retaining element 192 may be configured to couple the sleeve 56 to the stator 152 to resist axial movement of the sleeve 56. The retaining element 192 may have any suitable configuration. For example, the retaining element 192 may have a male configuration, a female configuration, or both. In the configuration shown, the retaining element 192 has a male configuration and is configured as a protrusion that extends from the exterior side of the second socket wall 174 in a direction that extends away from the axis 60. The retaining element 192 may extend partially or continuously around the axis 60.

Referring primarily to FIG. 6, the hose retainer 154 may help secure the hose 52 to the stator 152. The hose retainer 154 may be received inside the second socket wall 174 and may extend from the outside diameter of the hose 52 to the second socket wall 174. As such, the hose retainer 154 may encircle the hose 52 and may be at least partially received inside of the stator 152. The hose retainer 154 may also help inhibit axial movement of the seal 182. The hose retainer 154 may be received inside the sleeve 56 and may be spaced apart from or separated from at least a portion of the sleeve 56 as will be discussed in more detail below Referring primarily to FIGS. 4 and 6, the rotatable fitting 156, which may also be called a tee fitting, may be rotatable about the axis 60 with the hub 42. In addition, the rotatable fitting 156 may be spaced apart from and rotatable with respect to the hose 52, the sleeve 56, the torque tube 150, and the stator 152. For instance, a bearing 200 may extend from the torque tube 150 to the rotatable fitting 156 to facilitate rotation of the rotatable fitting 156 with respect to torque tube 150 and the stator 152. One or more seals 202 may also extend from the torque tube 150 to the rotatable fitting 156 to help inhibit the leakage of pressurized gas. In the configuration shown, seals 202 encircle the torque tube 150 and are axially positioned on opposite sides of the bearing 200. As such, the rotatable fitting 156 may be rotatable about the axis 60 with respect to the torque tube 150 and the stator 152. The rotatable fitting 156 may fluidly connect the torque tube 150 to one or more hose assemblies 58. As such, the rotatable fitting 156 may be adapted to be fluidly connected to a tire 22.

Referring primarily to FIGS. 2-6, the sleeve 56 may receive or encircle the hose 52. In addition, the sleeve 56 may be spaced apart from or may engage the hose 52. In at least one configuration, the sleeve 56 may be made of a flexible or resilient material, such as a polymeric material, rubber, or the like. The sleeve 56 may cooperate with the spindle plug 50 to limit rotation of the stator 152 and the hose 52 about the axis 60 as will be discussed in more detail below.

Figure 3:
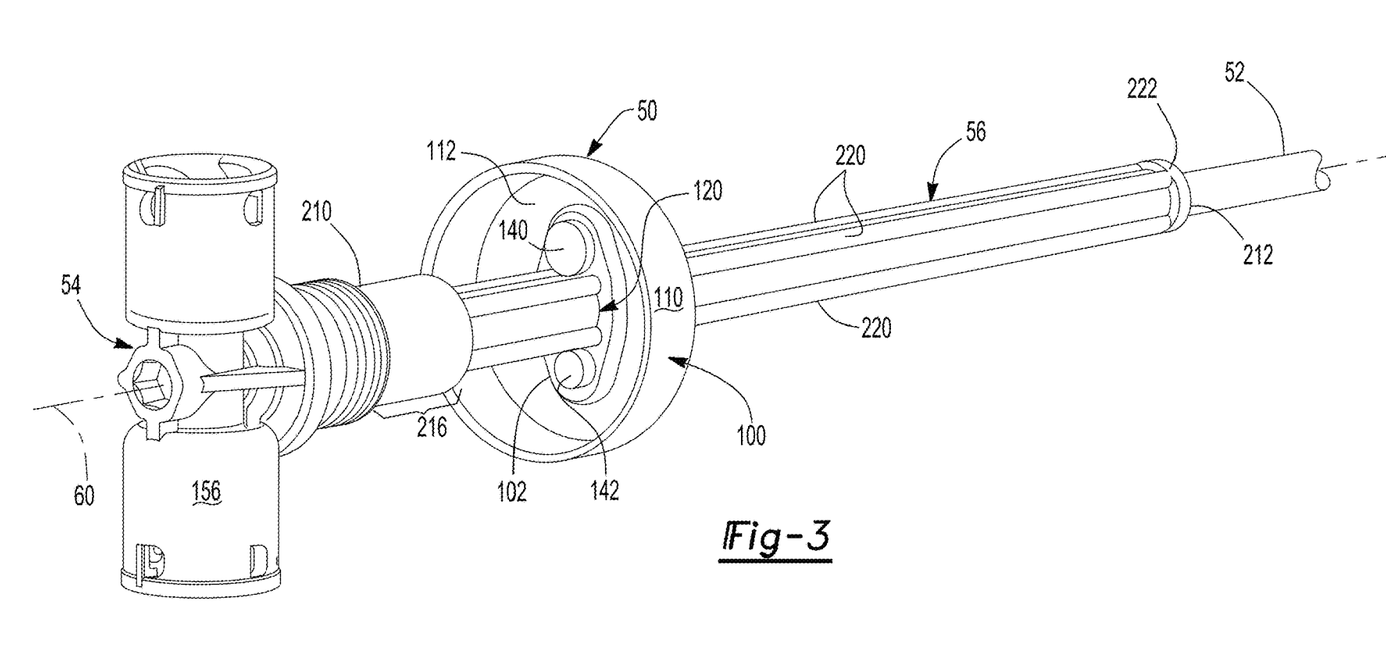
FIG. 3 is a perspective view of the portion of the axle assembly shown in FIG. 2 without a hub cap.

The sleeve 56 may extend from the spindle plug 50 to the rotary union 54. For instance, the sleeve 56 may extend through the opening 120 of the spindle plug 50 to the stator 152 of the rotary union 54. In at least one configuration and as is best shown in FIGS. 2-4, the sleeve 56 may have a first end 210, a second end 212, a sleeve hole 214, an enlarged portion 216, an elongated portion 218, at least one anti-rotation feature 220, a stop feature 222, or combinations thereof.

Referring primarily to FIGS. 2 and 4, the first end 210 may face toward the rotary union 54. As such, the first end 210 may be engageable with the rotary union 54.

The second end 212 may be disposed opposite the first end 210. As such, the second end 212 may face away from the rotary union 54. The second end 212 may be received inside of the spindle hole 64.

The sleeve hole 214 may extend from the first end 210 to the second end 212. The hose 52 and a portion of the rotary union 54 may be received in the sleeve hole 214. For instance, a portion of the stator 152 and optionally the torque tube 150 may be received in the sleeve hole 214.

Referring primarily to FIGS. 4 and 5, the enlarged portion 216 may extend from the first end 210. The enlarged portion 216 may extend further away from the axis 60 than the elongated portion 218 and may have a larger outside diameter than the elongated portion 218. In at least one configuration, the enlarged portion 216 may include one or more stator engaging anti-rotation features 230 and a retention feature 232.

Referring primarily to FIG. 5, one or more stator engaging anti-rotation features 230 may be provided inside the enlarged portion 216. A stator engaging anti-rotation feature 230 may extend from the first end 210 toward the elongated portion 218. A stator engaging anti-rotation feature 230 may mate with a corresponding anti-rotation element 190 of the stator 152 to help limit rotation of the sleeve 56 about the axis 60 with respect to the stator 152. The stator engaging anti-rotation feature 230 may have any suitable configuration that is compatible with the configuration of the anti-rotation element 190 of the stator 152, such as a male configuration, female configuration, or combinations thereof. In the configuration shown, the stator engaging anti-rotation feature 230 is configured as a groove that receives the anti-rotation element 190 of the stator 152.

The retention feature 232 may also be provided inside the enlarged portion 216. The retention feature 232 may mate with the retaining element 192 of the stator 152 to inhibit axial movement of the sleeve 56 with respect to the stator 152. The retention feature 232 may be disposed near the first end 210. For instance, the retention feature 232 may be spaced apart from the first end 210 and may extend partially or continuously around the axis 60. The retention feature 232 may have any suitable configuration that is compatible with the configuration of the retaining element 192 of the stator 152, such as a male configuration, female configuration, or combinations thereof. In the configuration shown, the retention feature 232 is configured as a groove that receives the retaining element 192 of the stator 152. The retention feature 232 may intersect or extend from one or more of the stator engaging anti-rotation features 230.

Referring to FIG. 2, at least a portion of the enlarged portion 216 may be spaced apart from the hose 52 and the stator 152 of the rotary union 54 such that a gap 240 may be formed between the enlarged portion 216 of the sleeve 56 and the hose 52. The gap 240 may be positioned closer to the axis 60 than a tapered portion 242 of the sleeve 56 that extends from the elongated portion 218. The tapered portion 242 may be knurled or provided with a texture that helps provide friction for gripping the sleeve 56.

Referring to FIG. 6, the sleeve 56 may be configured to disengage the stator 152 when the enlarged portion 216 is squeezed toward the axis 60 and the hose 52. For example, compressing the tapered portion 242 toward the axis 60 may cause the sleeve 56 to flex and expand at the first end 210 so that the retention feature 232 may move away from the axis 60 and may at least partially disengage the retaining element 192 of the stator 152.

Referring to FIGS. 2-5, the elongated portion 218 may extend from the second end 212 to the enlarged portion 216. One or more anti-rotation features 220 may be provided with the elongated portion 218. An anti-rotation feature 220 may have any suitable configuration that is compatible with the anti-rotation elements 190 of the stator 152. For instance, an anti-rotation feature 220 may have a male configuration, a female configuration, or both. In the configuration shown, the anti-rotation features 220 are configured as ribs that extend from an exterior side of the elongated portion 218 in a direction that extends away from the axis 60. As such, the anti-rotation features 220 may be disposed outside of the sleeve hole 214. A plurality of anti-rotation features 220 may be provided that may be spaced apart from each other and may be arranged around the axis 60. The anti-rotation features 220 or a portion thereof may extend parallel or substantially parallel to the axis 60. In at least one configuration, and an anti-rotation feature 220 may extend from the enlarged portion 216 toward or to the second end 212.

The sleeve 56 may cooperate with the spindle plug 50 to resist or limit rotation of the stator 152 and the hose 52 about the axis 60. The recesses 130 of the spindle plug 50 may engage or mate with the anti-rotation features 220 of the sleeve 56 to resist or limit rotation of the sleeve 56 about the axis 60 with respect to the spindle plug 50. The stator engaging anti-rotation features 230 of the sleeve 56 may engage or mate with the anti-rotation elements 190 of the stator 152 to resist or limit rotation of the stator 152 about the axis 60, thereby resisting or limiting rotation of the hose 52 in the torque tube 150 about the axis 60. The sleeve 56 may be configured to permit limited twisting between the spindle plug 50 and the stator 152. Twisting of the sleeve 56 may store energy in the sleeve 56 such that the sleeve 56 will further resist twisting and be biased to return to an untwisted state.

Referring primarily to FIGS. 2, 3, and 5, the stop feature 222 may be engageable with the spindle plug 50 to inhibit removal of the sleeve 56 from the spindle plug 50. The stop feature 222 may be disposed proximate the second end 212 of the sleeve 56. In at least one configuration, the stop feature 222 may encircle the elongated portion 218 and may be disposed at an end of one or more anti-rotation features 220 of the sleeve 56. The stop feature 222 may extend away from the axis 60 further than at least a portion of the opening 120 of the spindle plug 50 that receives the sleeve 56. The spindle plug 50 may be axially positioned between the enlarged portion 216 of the sleeve 56 and the stop feature 222. As such, moving the sleeve 56 to the left from the perspective shown in FIG. 2 may move the stop feature into engagement with the inboard side of the plug wall 112 of the spindle plug 50, and thereby inhibit the sleeve 56 from being pulled through the opening 120 and removed from the spindle plug 50.

Referring to FIG. 1, a hose assembly 58 may fluidly connect the rotatable fitting 156 to a tire 22. In the configuration shown, two hose assemblies 58 are depicted. Each hose assembly 58 may be fluidly connected to a different tire 22. A hose assembly 58 may have a first end and a second end. The first end may be connected to the rotatable fitting 156. The second end may be disposed opposite the first end and may be fluidly connected to a tire 22. For instance, the second end may be mounted to a tire valve 250 that may extend through a hole in the wheel 30 and that may permit gas to enter or exit the tire 22 when the tire valve 250 is open. The hose assembly 58 may be configured to hold the tire valve 250 in an open position when secured to the tire valve 250. Moreover, the tire valve 250 may close when the hose assembly 58 is disengaged from the tire valve 250 to prevent deflation of the tire 22.

Providing an axle assembly with a rotary fitting and sleeve as described above may allow the sleeve to help limit or prevent twisting of the torque tube and the hose, which may occur if the rotatable fitting becomes stuck or is otherwise inhibited from rotating with respect to the stator when the hub rotates. The resistance torque provided by the sleeve via its connection with the spindle plug helps resist and limit rotation of the stator, torque tube, and the hose. Limiting or preventing twisting of the hose inside the spindle may prevent the hose from kinking or being disengaged, thereby maintaining proper functionality of the tire inflation system and avoiding repairs and associated costs. The sleeve and spindle plug may cooperate to help maintain alignment of the hose. The stop feature of the sleeve and spindle plug may cooperate to resist inadvertent removal of the sleeve from the spindle plug during assembly or maintenance. The sleeve may also be easily installable and removable with a "pinch and pull" configuration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a spindle that defines a spindle hole that is disposed along an axis;
   a hub that is rotatable about the axis with respect to the spindle;
   a spindle plug that is disposed in the spindle hole and is fixedly positioned with respect to the spindle, the spindle plug defining an opening;
   a hose that extends through the opening;
   a rotary union comprising a stator and a rotatable fitting that is fluidly connected to the hose and rotatable about the axis with respect to the stator, wherein the rotatable fitting is adapted to be fluidly connected to a tire; and
   a sleeve that encircles the hose and that extends from the spindle plug to the stator, wherein the sleeve cooperates with the spindle plug to limit rotation of the stator and the hose about the axis, wherein the sleeve extends through the opening.

2. The axle assembly of claim 1 wherein at least a portion of the hose extends along the axis.

3. The axle assembly of claim 1 wherein the hub includes a hub cap that defines a hub cap cavity, and the spindle plug defines a vent opening that allows air to pass between the spindle hole and the hub cap cavity.

4. The axle assembly of claim 3 wherein the vent opening receives a filter.

5. The axle assembly of claim 1 wherein the spindle plug defines a sensor opening that receives a sensor.

6. An axle assembly comprising:
   a spindle that defines a spindle hole that is disposed along an axis;
   a hub that is rotatable about the axis with respect to the spindle;
   a spindle plug that is disposed in the spindle hole and is fixedly positioned with respect to the spindle, the spindle plug defining an opening;
   a hose that extends through the opening;
   a rotary union comprising a stator and a rotatable fitting that is fluidly connected to the hose and rotatable about the axis with respect to the stator, wherein the hose is received inside the stator and is coupled to the stator, and the rotatable fitting is adapted to be fluidly connected to a tire; and
   a sleeve that receives the hose and that extends from the spindle plug to the stator, wherein the spindle plug limits rotation of the sleeve, and the sleeve limits rotation of the stator and the hose about the axis, wherein the sleeve has a first end, a second end that is disposed opposite the first end, a sleeve hole that extends from the first end to the second end, and at least one anti-rotation feature that extends between the first end and the second end and that is disposed outside of the sleeve hole, wherein the anti-rotation feature engages the spindle plug to resist rotation of the sleeve about the axis.

7. The axle assembly of claim 6 wherein the sleeve has an enlarged portion that extends from the first end and an elongated portion that extends from the second end to the enlarged portion, wherein the enlarged portion extends further from the axis than the elongated portion and the anti-rotation feature is provided with the elongated portion.

8. The axle assembly of claim 7 wherein the anti-rotation feature extends from the enlarged portion toward the second end.

9. The axle assembly of claim 7 wherein the anti-rotation feature is configured as a rib that extends axially from the enlarged portion toward the second end.

10. The axle assembly of claim 7 wherein a gap is provided between the sleeve and the hose that permits the sleeve to disengage the stator when the enlarged portion is squeezed toward the axis.

11. The axle assembly of claim 7 wherein the sleeve includes a stop feature that extends away from the axis and that is disposed proximate the second end, wherein the stop feature is engageable with the spindle plug to inhibit the sleeve from being removed from the opening.

12. The axle assembly of claim 11 wherein the spindle plug is axially positioned between the enlarged portion and the stop feature.

13. The axle assembly of claim 11 wherein the enlarged portion extends further from the axis than the elongated portion and the stop feature encircles the elongated portion and is disposed at an end of the anti-rotation feature.

14. The axle assembly of claim 6 wherein the sleeve has an enlarged portion that extends from the first end and an elongated portion that extends from the second end to the enlarged portion, wherein a stator engaging anti-rotation feature is provided inside the enlarged portion that extends from the first end toward the elongated portion, and the stator engaging anti-rotation feature mates with the stator to limit rotation of the sleeve with respect to the stator.

15. The axle assembly of claim 14 wherein the enlarged portion has a retention feature that is spaced apart from the first end and that extends at least partially around the axis, wherein the retention feature mates with the stator to inhibit axial movement of the sleeve with respect to the stator.

16. The axle assembly of claim 15 wherein the retention feature encircles the axis and intersects the stator engaging anti-rotation feature.

17. An axle assembly comprising:
- a spindle that defines a spindle hole that is disposed along an axis;
- a hub that is rotatable about the axis with respect to the spindle;
- a spindle plug that is disposed in the spindle hole and is fixedly positioned with respect to the spindle, the spindle plug defining an opening;
- a hose that extends through the opening;
- a rotary union comprising a stator, a rotatable fitting, and a torque tube, wherein the rotatable fitting is fluidly connected to the hose, is rotatable about the axis with respect to the stator, and is adapted to be fluidly connected to a tire, wherein the hose is received inside the stator and is coupled to the stator, wherein the torque tube is received inside the stator and the hose and fluidly connects the stator to the rotatable fitting, and wherein the rotatable fitting is rotatable about the axis with respect to the torque tube; and
- a sleeve that receives the hose and that extends from the spindle plug to the stator, wherein the spindle plug limits rotation of the sleeve, and the sleeve limits rotation of the stator and the hose about the axis.

18. The axle assembly of claim 17 wherein a hose retainer encircles the hose and secures the hose to the stator, wherein the hose retainer is at least partially received inside the stator, is received inside the sleeve, and is spaced apart from the sleeve.

19. The axle assembly of claim 17 wherein the sleeve has a first end, a second end that is disposed opposite the first end, a sleeve hole that extends from the first end to the second end, and at least one anti-rotation feature that extends between the first end and the second end and that is disposed outside of the sleeve hole, wherein the anti-rotation feature engages the spindle plug to resist rotation of the sleeve about the axis.

20. The axle assembly of claim 19 wherein the sleeve extends through the opening.

* * * * *